United States Patent [19]

Kozaki et al.

[11] Patent Number: 5,035,928
[45] Date of Patent: Jul. 30, 1991

[54] LIQUID CRYSTAL DISPLAY DEVICE

[75] Inventors: Shyuichi Kozaki; Masako Okada; Fumiaki Funada; Kei Sasaki, all of Nara; Hideo Saito; Fusayuki Takeshita, both of Chiba, all of Japan

[73] Assignees: Sharp Kabushiki Kaisha & Chisso Corp., 61991 10 099 07301991 JPX Japan 09061989 1-232372 6 1 1 Thomas; Alexander S. 6 9 11; Chisso Corp., both of Osaka, Japan

[21] Appl. No.: 577,162

[22] Filed: Sep. 4, 1990

[30] Foreign Application Priority Data

Sep. 6, 1989 [JP] Japan .................................. 1-232372
Mar. 23, 1990 [JP] Japan .................................. 2-74549

[51] Int. Cl.⁵ ................................................ C09K 3/34
[52] U.S. Cl. ...................................... 428/1; 350/340; 350/341
[58] Field of Search ............... 428/1; 350/341, 350 R, 350/340

[56] References Cited

U.S. PATENT DOCUMENTS 4,911,958 3/1990 Mochizuki ............................. 428/1

Primary Examiner—Alexander S. Thomas
Attorney, Agent, or Firm—Birch, Stewart, Kolasch & Birch

[57] ABSTRACT

Disclosed is an improvement of an active matrix type liquid crystal display device using a combination of a specific mixed liquid crystal and a specific polyimide orientation film.

6 Claims, 6 Drawing Sheets (a)

(b)

LIQUID CRYSTAL DISPLAY DEVICE

FIELD OF THE INVENTION

The present invention relates to an active matrix type liquid crystal display device.

BACKGROUND OF THE INVENTION

The active matrix type liquid crystal device, in which the non-linear active element (e.g. the switching transistor) is attached to each picture element, has become important and useful for pocketable color televisions and computer terminals, because the device provides pictures with high contrast and no cross-talk phenomenon by the switching function of the non-linear active element. For making such devices colorized, four processes have been proposed, i.e. (1) a guest and host effect process wherein a colorant is mixed in a liquid crystal, (2) a twisted nematic (TN) process using a colored polarizing panel, (3) an ECB (electrically controlled birefringence) process using the birefringence phenomenon of a liquid crystal by means of electric field, (4) a color filter process wherein a color filter layer which is colored with red, green and blue are formed in a liquid crystal cell and the liquid crystal layer is used as light shutter. In the four processes, the color filter process (4) is the most useful and important process, because the process can provide more contrast fullcolor pictures. In this color filter process, twisted nematic liquid crystal is employed.

The process (4) is classified into two groups in view of the arranging way of the two polarizing panels. One is normally black process wherein the device displays black color at no applied voltage (at OFF position), thus the polarizing panels being parallel with each other. The other is normally white process wherein the device displays white at no applied voltage (at off position), thus the polarizing panels being orthogonal with each other. Preferred is the normally white process in view of display characteristics, such as displayed picture contrast, color reproducibility and dependency on visual angle of displayed picture, if sufficiently high applied voltage can be ensured.

FIG. 4 (a) and (b) schematically show a liquid crystal display device to which a switching transistor q is attached. The switching transistors q and picture element electrodes c are formed at intersections of signal electrodes a and scanning electrodes b, and the elements a, b, c and q are all formed on a first substrate d. A counter electrode e is formed on a second substrate f, and a liquid crystal layer g is held between the first and second substrates d and f. One picture element is equivalent to an equivalent circuit and a driving voltage wave as respectively shown in FIG. 5 and FIG. 6 (a)-(c). In FIGS. 5 and 6, if the scanning signal $V_G$ which is applied to the scanning electrode b turns on the transistor q, the signal voltage $V_S$ which is applied to the signal electrode a is charged between the first and second substrates d and f, because the liquid crystal layer g is functioned as a condenser $CL_C$. The charged voltage is kept between the substrates until the transistor q is turned on. Accordingly, a voltage $V_D$ is applied on the liquid crystal q at the same time as the static drive to display picture.

The above described FIG. 5 show ideal picture elements, but actually as shown in FIG. 7, the liquid crystal layer has a resistant component r which is equivalent to an electrical resistance $RL_C$. It is believed that the resistance is caused by electroconductive materials, such as contaminations externally introduced into the liquid crystal or decomposed materials of the liquid crystal. Accordingly, the charged voltage $V_D$, as shown in FIG. 8, discharges though the liquid crystal layer to result in decrease of voltage with time. The smaller the specific resistance, the larger the decrease of voltage In FIG. 9, a voltage wave applied to the liquid crystal layer is shown in case where PCH type liquid crystal layer is shown in case where PCH type liquid crystal

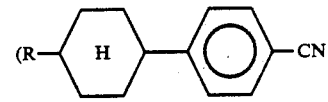

wherein R represents an alkyl group) having a positive dielectric anisotropy is employed. FIG. 9 (c) shows a $V_D$ voltage wave at 25° C. and FIG. 9 (d) shows a $V_D$ voltage at 80° C. This shows that the smaller the specific resistance of the liquid crystal, the smaller the effective voltage applied to the liquid crystal layer. In order to evaluate the decreasing amount of the effective voltage, a voltage retention (%) is introduced as a parameter. The voltage retention is defined effective value of actual $V_D$ voltage divided by effective value of $V_D$ voltage, when a resistant component of the liquid crystal are indefinitely high. The voltage retentions in FIG. 9 (c) and (d) are respectively 97% and 92%. As is known to the art, since liquid crystal exhibits accumulative response effective against voltage, the display characteristics of the liquid crystal depend on the effective voltage applied to the liquid crystal and therefore a decrease of the effective voltage reduces displayed picture contrast. In view of practical use, it is desired that the voltage retention is 98% or more at a maximum driving temperature. As is apparent from the above, the voltage retention depends on the product of capacity of the liquid crystal ($C_{LC}$) and resistance $R_{LC}$) (Time Constant), i.e. the product of specific dielectric constant L ($\Delta\epsilon$) and specific resistance. In order to enhance the voltage retention, it is required to increase the time constant of the liquid crystal, but B. Rieger et.al. have found that the time constant is tend to decrease as the specific dielectric constant increases (B. Rieger et.al. 18th. Int. Symp. on Liq. Crystal. Freiburg (1989)).

Accordingly, in order to increase the voltage retention, the specific dielectric constant of the liquid crystal should be lowered. This, however, means that the driving voltage of the liquid crystal becomes higher in view of the following relation;

$$V_{th} \propto \sqrt{K/\Delta\epsilon}$$

wherein $V_{th}$:threshold voltage of liquid crystal, K:elastic constant of liquid crystal. This causes many problems such as the increase of demand voltage of the circuit and the use of a circuit element which is resistant to high voltage. This raises more serious problems in case of projection type liquid crystal display devices and liquid crystal display devices for automobiles which are used at a high ambient temperature, as well as computer display of fine and high capacity.

SUMMARY OF THE INVENTION

The present invention provides an active matrix type liquid crystal display device which does not have the above mentioned problems. The liquid crystal display device comprises a first substrate having thereon a switching transistor and a picture element electrode at an intersection of a signal electrode and a scanning electrode, a second substrate having a counter electrode at least on an area facing said picture element electrode, orientation films formed on said first and second substrates with facing each other, and a mixed liquid crystal layer held between said first and second substrates at a constant thickness, characterized in that said mixed liquid crystal comprises, as liquid crystal compound having a positive dielectric anisotropy, (a) at least one liquid crystal compound represented by

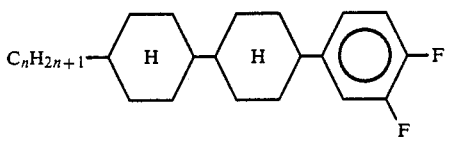

wherein n is an integer of 1 to 10,
(b) at least one liquid crystal compound represented by

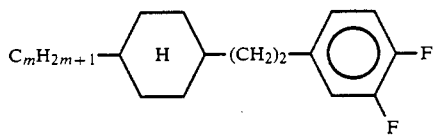

wherein m is an integer of 1 to 10, and
(c) at least one liquid crystal compound represented by

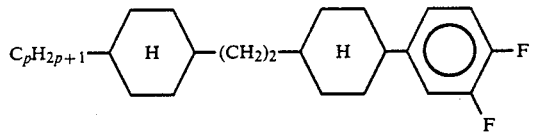

wherein p is an integer of 1 to 10, and
said orientation films are formed from a polyimide having a main chain represented by

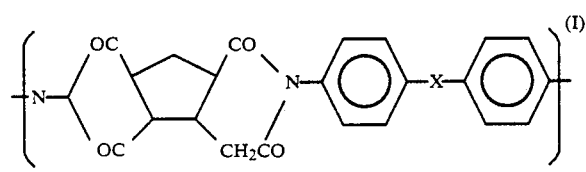

wherein X represents O, $CH_2$ or $C(CH_3)_2$.

The mixed liquid crystal can be changed to a mixture comprising (a) at least one liquid crystal compound represented by

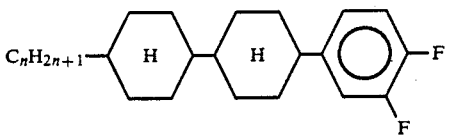

wherein n is an integer of 1 to 10,
(b) at least one liquid crystal compound represented by

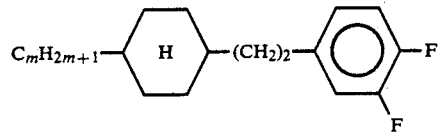

wherein m is an integer of 1 to 10,
(c) at least one liquid crystal compound represented by

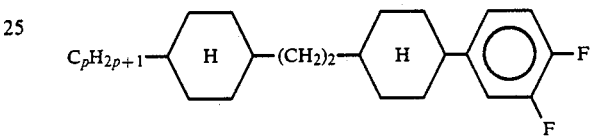

wherein p is an integer of 1 to 10, and
(d) at least one liquid crystal compound represented by

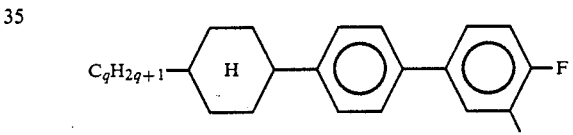

wherein q is an integer of 1 to 10.

The mixed liquid crystal can also be changed to a mixture comprising (a) at least one liquid crystal compound represented by

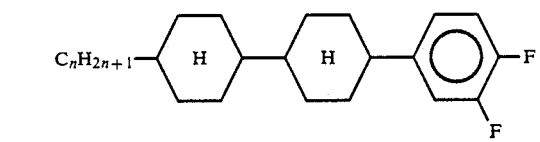

wherein n is an integer of 1 to 10,
(c) at least one liquid crystal compound represented by

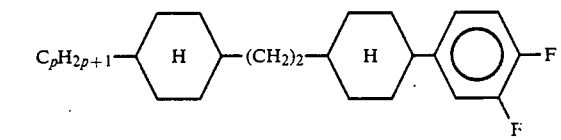

wherein p is an integer of 1 to 10,
(e) at least one liquid crystal compound represented by

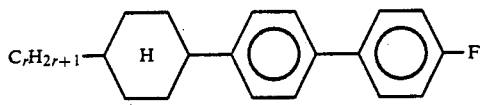

wherein r is an integer of 1 to 10, (f) at least one liquid crystal compound represented by

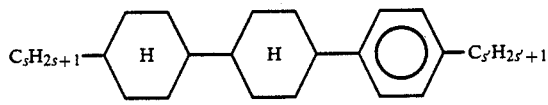

wherein s and s' are respectively an integer of 1 to 10, and (g) at least one liquid crystal compound represented by

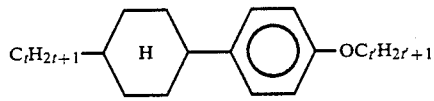

wherein t and t' are respectively an integer of 1 to 10.

The device has a high voltage retnetion, even if a specific dielectric constant ($\Delta\epsilon$) of the liquid crystal is high. Accordingly, a discharging voltage can be made very small, and the device has very good display characteristics.

PREFERRED EMBODIMENT OF THE INVENTION

In order to realize a liquid crystal device which has a high voltage retention and can be driven with a low driving voltage, a liquid crystal which has a positive specific dielectric constant anisotropy (Np compound) should be selected. Each Np compound is poured in a liquid crystal cell for determining the voltage retention (%) which is determined using a retention measuring system which is shown in FIG. 2. A construction of the liquid crystal cell for determining voltage retention is shown in FIG. 3. A transparent insulating substrate 18 is formed on the substrate 18 and an orientation film 22a is formed thereon to form an electrode substrate 16. An electrode 21 is formed on a transparent insulating substrate 19 which is formed from glass, quartz and the like, on which a orientation film 22b is formed, thus obtaining a counter electrode substrate 17. The orientation films 22a and 22b are provided for orientating liquid crystal molecules to a certain direction to form a twisted nematic liquid crystal layer 23. The films 22a and 22b are a polyimide film which has a main chain represented by

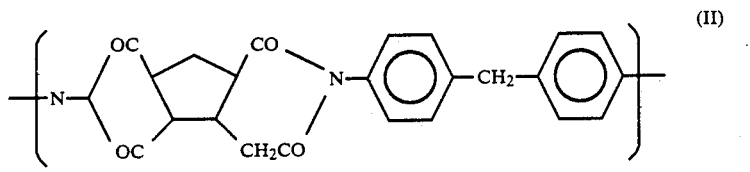

They are prepared by coating a solution of an aliphatic tetracarboxylic anhydride and derivative having a main chain of the formula (II) in gamma-butyl lactone on the substrate using a spinner coat, a roll coat or a printing method, followed by curing at 180° C. for one hour and rubbing the surface threreof. The orientation films 22a and 22b twist by 90° the longitudinal axes of the liquid crystal molecules between the electrode substrates 16 and 17. A voltage is applied across the twisted nematic liquid crystal layer 23 through the electrodes 20 and 21 which are transparent electrodes prepared from $In_2O_3$, etc. As is shown in FIG. 2, a switching transistor (FET) and a driving circuit 24 are connected with the display to apply a voltage between the electrode substrates 22a and 22b. A circuit 25 for measuring a discharging amount of electric charge which is reserved in the liquid crystal layer 23 is also connected with the electrode substrates 22a and 22b.

Some mixed liquid crystals were formulated from the compositions as shown in Table 1 and their voltage retentions were measured using the above mentioned circuit. The results are shown in Table 1.

TABLE 1

| NO. | Mixed liquid crystal | Percentage composition | voltage retention | Evaluation |
|---|---|---|---|---|
| 1 | | 33% | 98.3% | Suitable |
| | | 33% | | |

TABLE 1-continued

| NO. | Mixed liquid crystal | Percentage composition | voltage retention | Evaluation |
|---|---|---|---|---|
| | C₅H₁₁–[H]–[H]–[⌬]<F, F (3,4-diF) | 34% | | |
| 2 | C₂H₅–[H]–[⌬]<F,F | 6% | 98.6% | Suitable |
| | C₃H₇–[H]–[⌬]<F,F | 7% | | |
| | C₅H₁₁–[H]–[⌬]<F,F | 7% | | |
| | NO. 1 | 80% | | |
| 3 | C₃H₇–[H]–(CH₂)₂–[⌬]<F,F | 10% | 99.2% | Suitable |
| | C₂H₅–[H]–(CH₂)₂–[H]–[⌬]<F,F | 13% | | |
| | C₃H₇–[H]–(CH₂)₂–[H]–[⌬]<F,F | 13% | | |
| | C₅H₁₁–[H]–(CH₂)₂–[H]–[⌬]<F,F | 14% | | |
| | NO. 1 | 50% | | |
| 4 | C₂H₅–[H]–[⌬]–CN | 33% | 95.7% | Unsuitable |
| | C₃H₇–[H]–[⌬]–CN | 33% | | |

TABLE 1-continued

| NO. | Mixed liquid crystal | Percentage composition | voltage retention | Evaluation |
|---|---|---|---|---|
| | C$_5$H$_{11}$—H—⬡—CN | 34% | | |
| 5 | C$_2$H$_5$—H—⬡(F)—CN | 6% | 93.0% | Unsuitable |
| | C$_3$H$_7$—H—⬡(F)—CN | 6% | | |
| | C$_5$H$_{11}$—H—⬡(F)—CN | 7% | | |
| | NO. 1 | 80% | | |
| 6 | C$_2$H$_5$—H—H—⬡—CN | 6% | 96.2% | Unsuitable |
| | C$_3$H$_7$—H—H—⬡—CN | 6% | | |
| | C$_5$H$_{11}$—H—H—⬡—CN | 7% | | |
| | NO. 1 | 80% | | |
| 7 | C$_3$H$_7$—H—⬡(F)—CN | 10% | 86.5% | Unsuitable |
| | C$_5$H$_{11}$—H—⬡(F)—CN | 10% | | |
| | C$_3$H$_7$—H—COO—⬡—F | 6% | | |
| | C$_5$H$_{11}$—H—COO—⬡—F | 6% | | |

TABLE 1-continued

| NO. | Mixed liquid crystal | Percentage composition | voltage retention | Evaluation |
|-----|----------------------|------------------------|-------------------|------------|
| | C₃H₇—[H]—[H]—COO—⌬—F | 6% | | |
| | C₅H₁₁—[H]—[H]—COO—⌬—F | 6% | | |
| | C₂H₅—[H]—[H]—⌬—CH₃ | 8% | | |
| | C₃H₇—[H]—[H]—⌬—CH₃ | 8% | | |
| | NO. 1 | 40% | | |
| 8 | C₅H₁₁—[H]—(CH₂)₂—⌬(3,4-F₂) | 16% | 99.4% | Suitable |
| | C₂H₅—[H]—(CH₂)₂—[H]—⌬(3,4-F₂) | 8% | | |
| | C₃H₇—[H]—(CH₂)₂—[H]—⌬(3,4-F₂) | 4% | | |
| | C₅H₁₁—[H]—(CH₂)₂—[H]—⌬(3,4-F₂) | 8% | | |
| | C₂H₅—[H]—⌬—⌬(3,4-F₂) | 6% | | |
| | C₃H₇—[H]—⌬—⌬(3,4-F₂) | 6% | | |
| | C₅H₁₁—[H]—⌬—⌬(3,4-F₂) | 6% | | |

TABLE 1-continued

| NO. | Mixed liquid crystal | Percentage composition | voltage retention | Evaluation |
|---|---|---|---|---|
|  | NO. 1 | 47% |  |  |
| 9 | 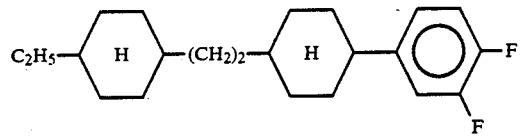 | 10.8% | 99.5% | Suitable |
|  | 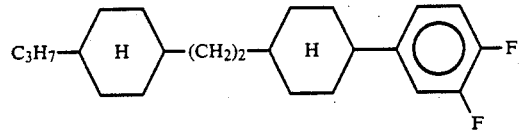 | 5.4% |  |  |
|  | 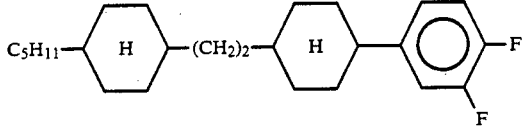 | 10.8% |  |  |
|  | 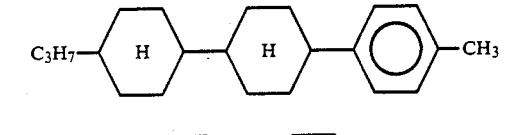 | 6% |  |  |
|  | 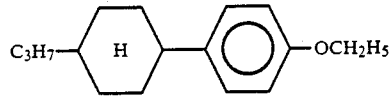 | 9% |  |  |
|  | 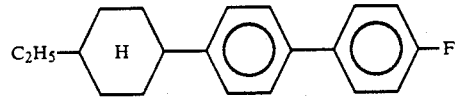 | 5% |  |  |
|  | 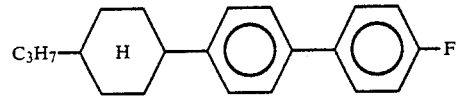 | 6% |  |  |
|  | NO. 1 | 47% |  |  |

As is apparent from Table 1, the mixed liquid crystals Nos. 1 to 3, 8 and 9 are preferred in view of voltage retention, but the others have poor voltage retentions.

FIG. 1 schematically shows a construction of the active matrix type liquid crystal display of the present invention. In FIG. 1, a twisted nematic liquid crystal layer 7 is held between a display electrode substrate 5 and a counter electrode substrate 6. The display electrode substrate 5 is composed of a transparent insulating substrate 8 which is prepared from glass, quartz etc., a picture system including a picture electrode 9 formed on the substrate 8 and an orientation film 10a formed thereon. The switching transistor includes a-Si, P-Si thin film transistor (TFT) and the like. The counter electrode 6 is composed of a transparent insulating substrate 11 prepared from glass, quartz et., a color filter 12 formed thereon, a transparent counter electrode 13 formed on the color filter 12 and an orientation film 10b formed on the electrode 13. The color filter 12 is colored three colors, e.g. red, green and blue, which face each picture element. The picture electrode 9 and the counter electrode 13 are transparent and prepared from In$_2$O$_3$, with which a driving circuit 14 is connected. The orientation films 10a and 10b are provided for twisting the liquid crystal molecules of the twisted nematic liquid crystal layer 7 and composed of a polyimide film as shown in the formula (II) which has been rubbed. The formula (II) shows that in the formula (I) X is CH$_2$, but the others, i.e. 0, C(CH$_3$)$_2$, show the same results. The orientation films 10a and 10b may twist the longitudinal axes of the liquid crystal molecules within the range of 60 to 270° between the display electrode substrate 5 and counter electrode substrate 6, but preferred is 90° for obtaining contrasty pictures. The thickness of the liquid crystal layer is set 5.0 micrometer in view of response properties, visual angle properties and color hue. The color filter 12 can be dyed by electrocoating, color ink printing and the like. In the present invention, a gelatin film with about 1 micrometer thickness is patterned by photolithography and then dyed with three primary color (red green and blue). The twisted nematic liquid crystal layer 7 is sealed and kept a desired thickness with an epoxy resin seal 15. A Δn·d value (Δn show a birefringence of the liquid crystal and d is a thickness of the liquid crystal layer) of the liquid crystal display is preferably set within the range of 0.3 to 0.6 micrometer to obtain contrasty pictures having a wide visual angle in case of the normally white process.

As the result of the voltage retention test as mentioned above, the mixed liquid crystals Nos. 3, 8 and 9 are selected. The No. 3 and No. 8 liquid crystals showed a Δn value of 0.08, thus Δn·d being 0.4 micrometer. The No. 9 liquid crystal showed a Δn value of 0.09, thus Δn·d being 0.45 micrometer. In FIG. 1, numbers 3 and 4 indicate polarizing plates which are present on the outer surface of the liquid crystal element. The polarizing axis of the polarizing plate is orthogonal with the longitudinal axes of the liquid crystal molecules which are adjacent to the polarizing plate. Thus, the axes of the polarizing plates 3 and 4 are orthogonal with each other. The obtained liquid crystal display device of the present invention was evaluated on electro-optical properties and an aging test with passing electric current at an ambient temperature of 80° C. The results are shown in Table 2.

TABLE 2

|  | No. 3 | No. 8 | No. 9 | Conventional one |
|---|---|---|---|---|
| Threshold voltage (V) | 1.65 | 1.65 | 2.00 | 2.20 |
| Δn | 0.08 | 0.08 | 0.09 | 0.09 |
| TNI (°C.) | 86.2 | 86.2 | 102.2 | 102 |
| Voltage retention (25° C.) | 99.2 | 99.2 | 99.5 | 98.5 |
| Voltage retention (100° C.) | 99.0 | 99.0 | 98.2 | 90.0 |
| Aging test (Vrms = 4 V, after 1,000 hours) | No change | | | Nonuniformity in displayed picture |

As is apparent from the above results, the device of the present invention has very good display characteristics after the aging test with passing electric current. For comparison, a conventional mixed liquid crystal (cyano-phenyl chyclohexan) were employed and the same evaluations were made. The results are shown in Table 2.

COMPARATIVE EXAMPLE

Liquid crystal display devices were produced as generally described in the above mentioned preferred embodiment, with the exception that the polyimide orientation films are changed to those as shown in Table 3. The voltage retention was evaluated as mentioned above and the results are shown in Table 3. The voltage retentions are poor in comparison with the device of the present invention.

TABLE 3

| NO. | Chemical structure of polarizing film | Voltage retention | Evaluation |
|---|---|---|---|
| 1 | | 96.7% | Unsuitable |
| 2 | | 94.3% | Unsuitable |
| 3 | | 93.6% | Unsuitable |

Figure 1:
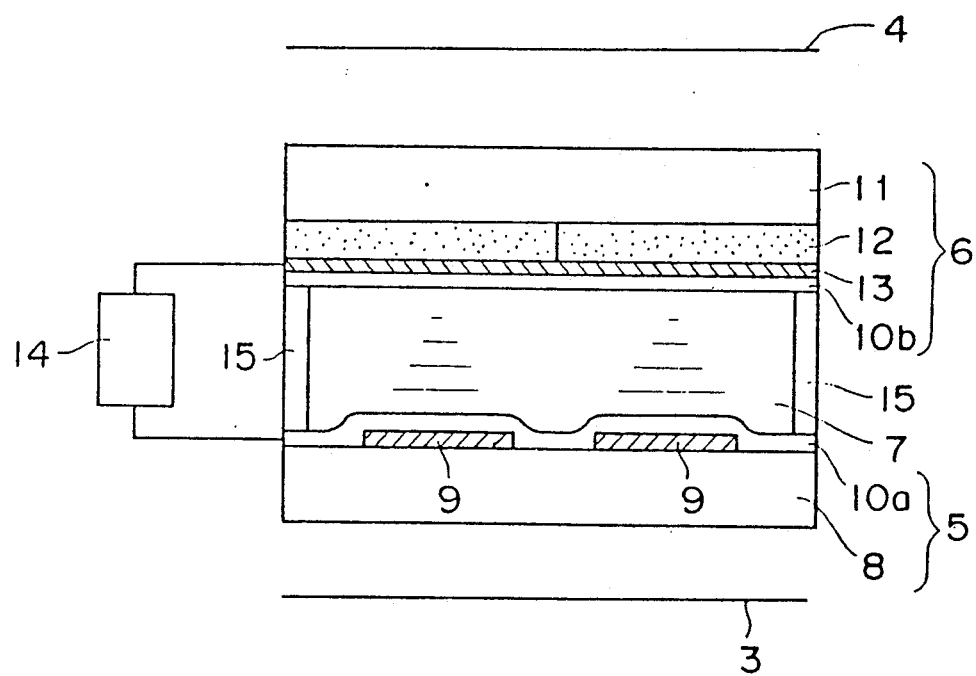
FIG. 1 is a sectional view which schematically shows the liquid crystal display device of the present invention.
Figure 2:
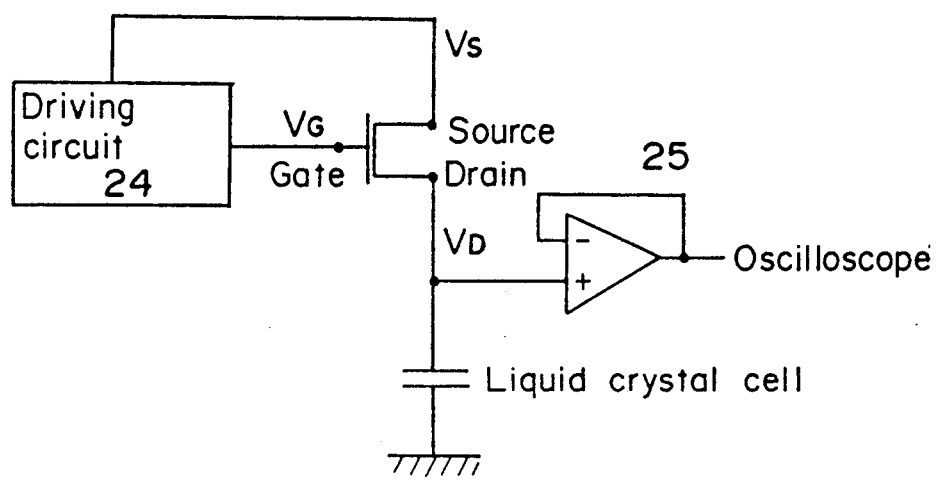
FIG. 2 is a system drawing for measuring the voltage retention of a liquid crystal.
Figure 2:
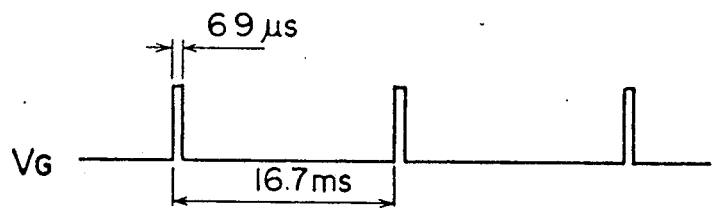
Figure 2:
Figure 2:
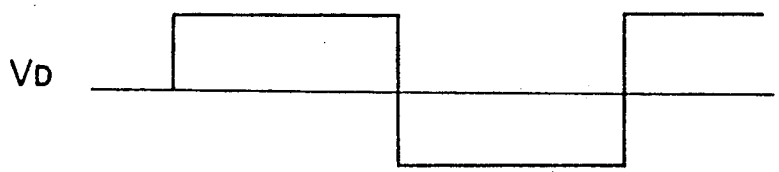
Figure 3:
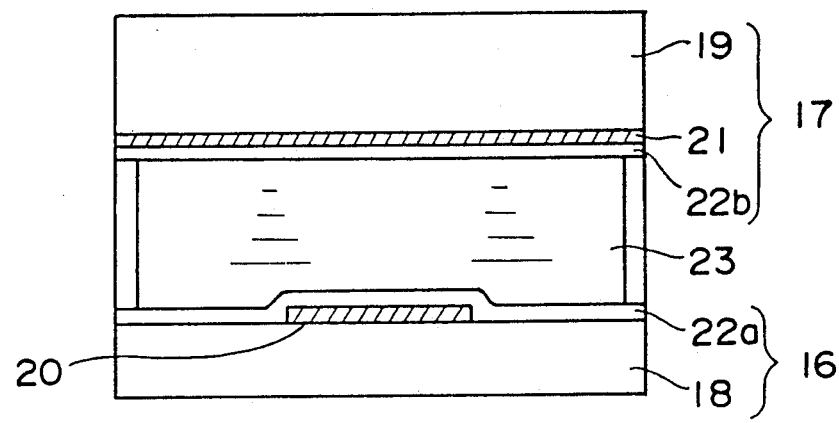
FIG. 3 is s sectional view which schematically shows the liquid crystal cell for measuring the voltage retention of a liquid crystal.
Figure 4:
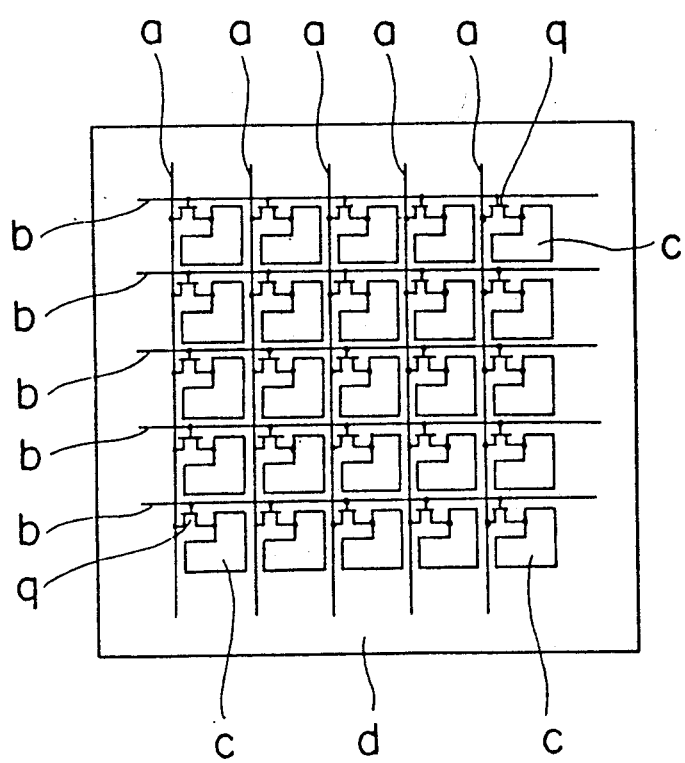
FIG. 4 shows a construction of the liquid crystal display device to which a switching transistor is attached.
Figure 4:
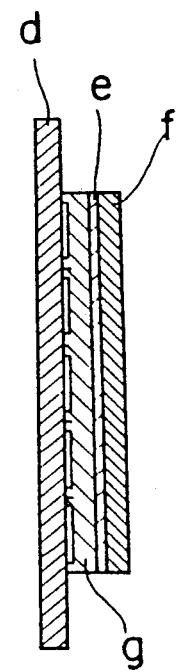
Figure 5:
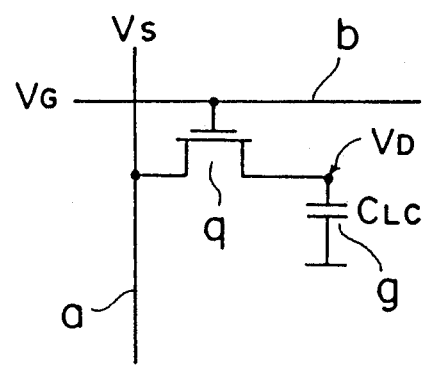
FIG. 5 shows an ideal equivalent circuit of one picture element.
Figure 6:
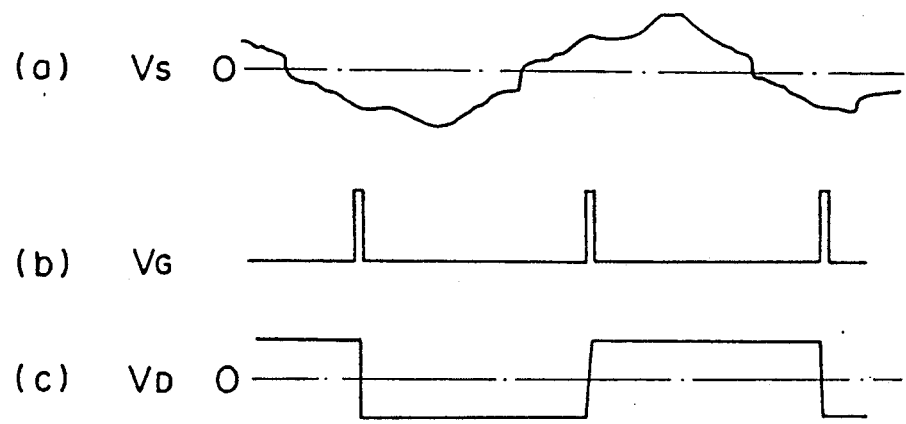
FIG. 6 shows a driving voltage wave of the circuit of FIG. 5.
Figure 7:
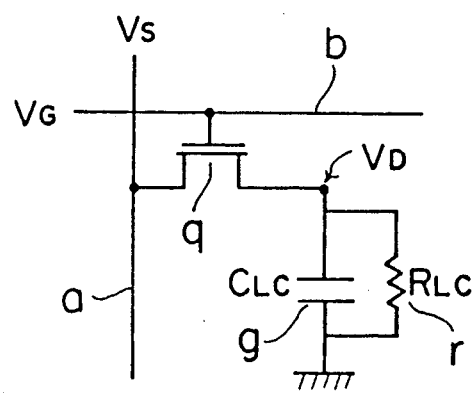
FIG. 7 shows an actual equivalent circuit of one picture element.
Figure 8:
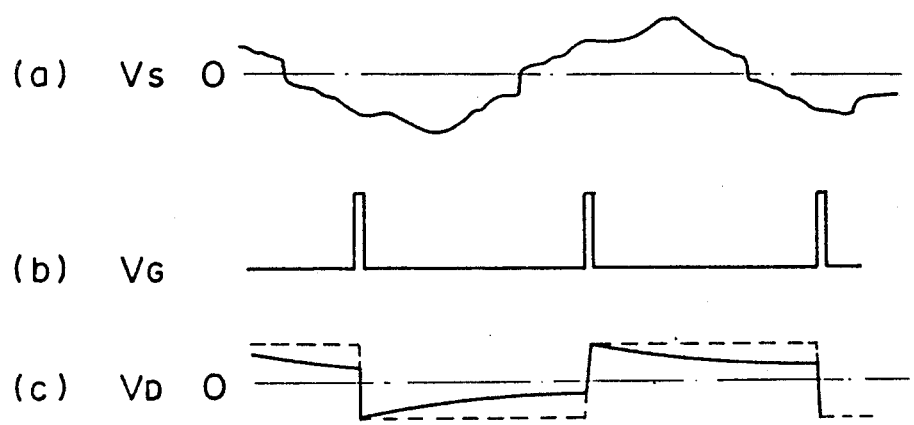
FIG. 8 shows a driving voltage wave of the circuit of FIG. 7.
Figure 9:
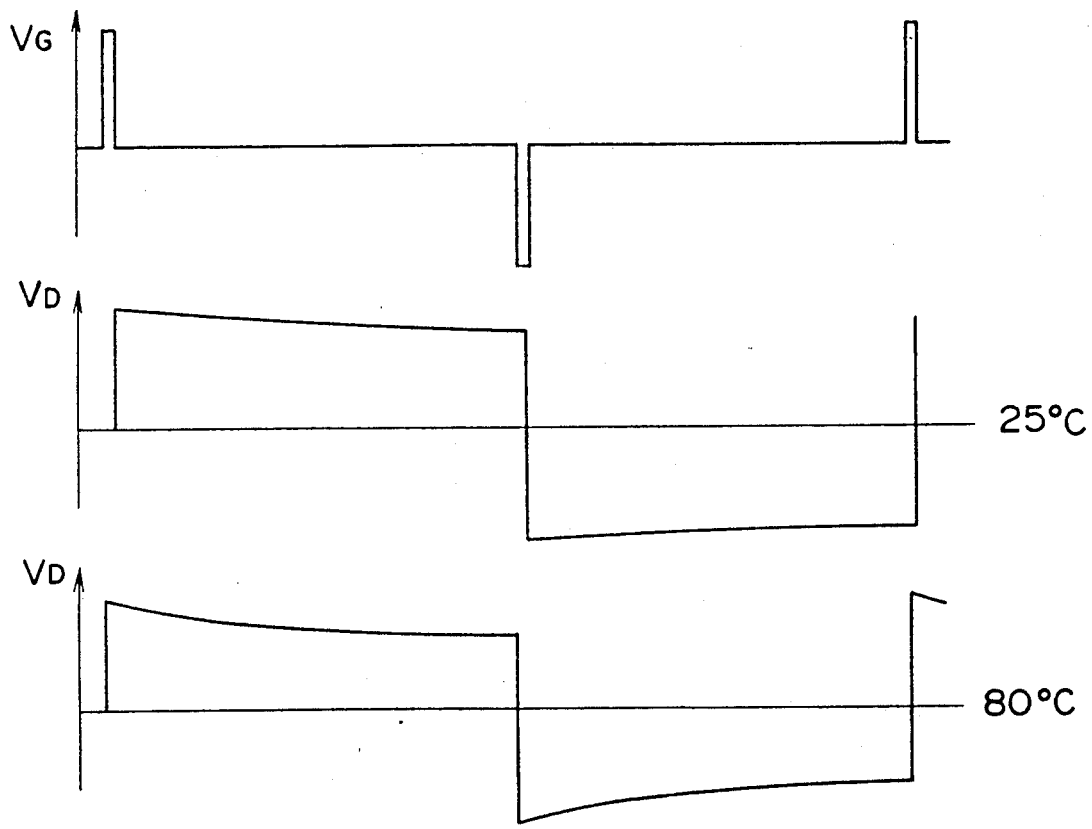
FIG. 9 shows a voltage wave which is applied to the liquid crystal layer of the present invention.

What is claimed is:

1. An active matrix type liquid crystal display device comprising
    a first substrate having thereon a switching transistor and a picture element electrode at an intersection of a signal electrode and a scanning electrode,
    a second substrate having a counter electrode at least on an area facing said picture element electrode,
    orientation films formed on said first and second with facing each other, and
    a mixed liquid crystal layer held between said first and second substrates at a constant thickness,
    characterized in that said mixed liquid crystal comprises, as liquid crystal compound having a positive dielectric anisotropy,
    (a) at least one liquid crystal compound represented by $C_nH_{2n+1}$—[H]—[H]—⟨F, F⟩ wherein n is an integer of 1 to 10,
(b) at least one liquid crystal compound represented by $C_mH_{2m+1}$—[H]—$(CH_2)_2$—⟨F, F⟩ wherein m is an integer of 1 to 10, and
(c) at least one liquid crystal compound represented by $C_pH_{2p+1}$—[H]—$(CH_2)_2$—[H]—⟨F, F⟩ wherein p is an integer of 1 to 10, and
said orientation films are formed from a polyimide having a main chain represented by $$\left\{ N \underset{OC}{\overset{OC}{\diagup}} \underset{CH_2CO}{\overset{CO}{\diagdown}} N - \bigcirc - X - \bigcirc \right\} \quad (I)$$

wherein X represents O, $CH_2$ or $C(CH_3)_2$.

2. The liquid crystal display device according to claim 1 wherein said mixed liquid crystal comprises, as liquid crystal compound having a positive dielectric anisotropy, $C_2H_5$—[H]—[H]—⟨F, F⟩

$C_3H_7$—[H]—[H]—⟨F, F⟩

$C_5H_{11}$—[H]—[H]—⟨F, F⟩

-continued $C_3H_7$—[H]—$(CH_2)_2$—⟨F, F⟩

$C_2H_5$—[H]—$(CH_2)_2$—[H]—⟨F, F⟩

$C_3H_7$—[H]—$(CH_2)_2$—[H]—⟨F, F⟩

$C_5H_{11}$—[H]—$(CH_2)_2$—[H]—⟨F, F⟩

3. An active matrix liquid crystal display device comprising
a first substrate having thereon a switching transistor and a picture element electrode at an intersection of a signal electrode and a scanning electrode,
a second substrate having a counter electrode at least on an area facing said picture element electrode,
orientation films formed on said first and second substrates with facing each other, and
a mixed liquid crystal layer held between said first and second substrates at a constant thickness,
characterized in that said mixed liquid crystal comprises, as liquid crystal compound having a positive dielectric anisotropy,
(a) at least one liquid crystal compound represented by $C_nH_{2n+1}$—[H]—[H]—⟨F, F⟩ wherein n is an integer of 1 to 10,
(b) at least one liquid crystal compound represented by $C_mH_{2m+1}$—[H]—$(CH_2)_2$—⟨F, F⟩ wherein m is an integer of 1 to 10,
(c) at least one liquid crystal compound represented by

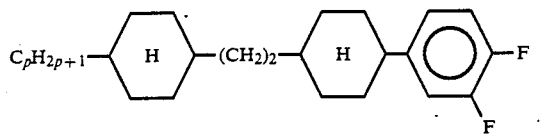

wherein p is an integer of 1 to 10, and
(d) at least one liquid crystal compound represented by

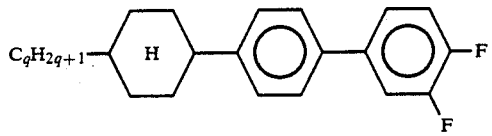

wherein q is an integer of 1 to 10, and
said orientation films are formed from a polyimide having a main chain represented by

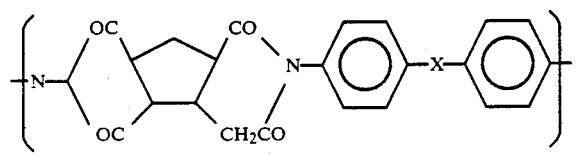

wherein X represents O, $CH_2$ or $C(CH_3)_2$.

4. The liquid crystal display device according to claim 3 wherein said mixed liquid crystal comprises, as liquid crystal compound having a positive dielectric anisotropy,

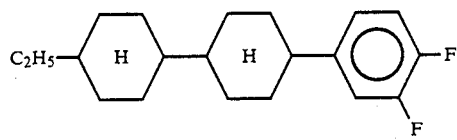

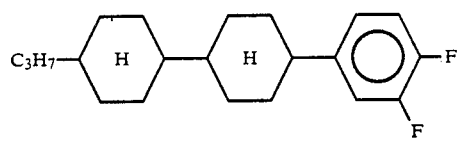

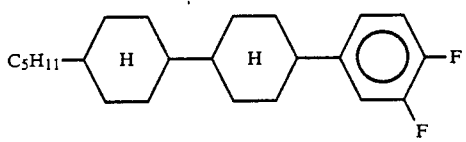

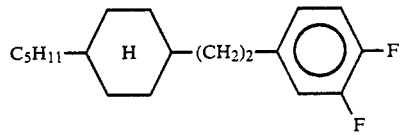

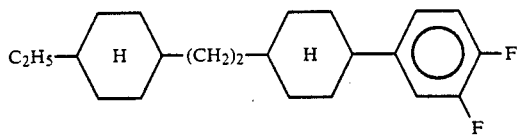

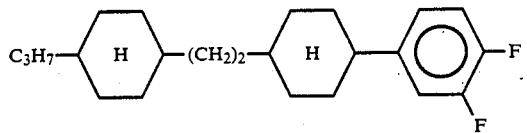

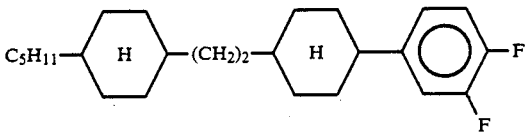

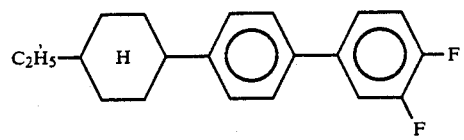

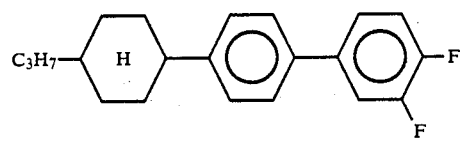

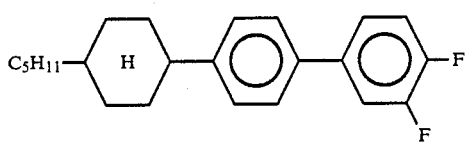

5. An active matrix liquid crystal display device comprising
a first substrate having thereon a switching transistor and a picture element electrode at an intersection of a signal electrode and a scanning electrode,
a second substrate having a counter electrode at least on an area facing said picture element electrode,
orientation films formed on said first and second substrates with facing each other, and
a mixed liquid crystal layer held between said first and second substrates at a constant thickness,
characterized in that said mixed liquid crystal comprises, as liquid crystal compound having a positive dielectric anisotropy,
(a) at least one liquid crystal compound represented by

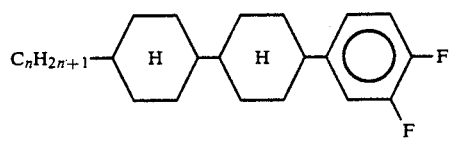

wherein n is an integer of 1 to 10,
(c) at least one liquid crystal compound represented by

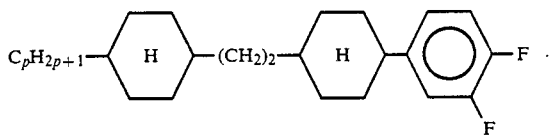

wherein p is an integer of 1 to 10,
(e) at least one liquid crystal compound represented by

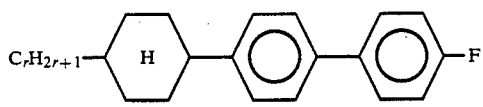

wherein r is an integer of 1 to 10,
(f) at least one liquid crystal compound represented by

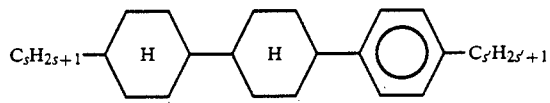

wherein s and s' are respectively an integer of 1 to 10, and
(g) at least one liquid crystal compound represented by

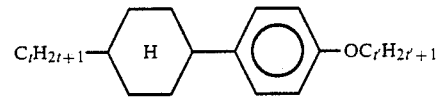

wherein t and t' are respectively an integer of 1 to 10 and
said orientation films are formed from a polyimide having a main chain represented by

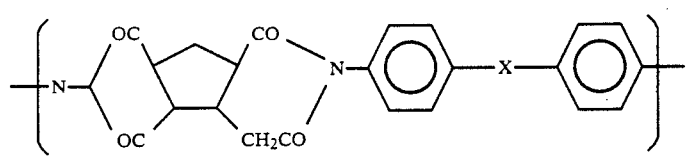

wherein X represents O, $CH_2$, or $C(CH_3)_2$.

6. The liquid crystal display device according to claim 5 wherein said mixed liquid crystal comprises, as liquid crystal compound having a positive dielectric anisotropy,

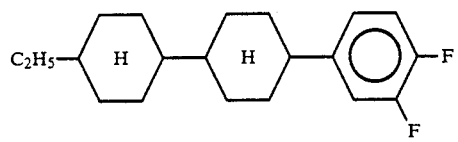

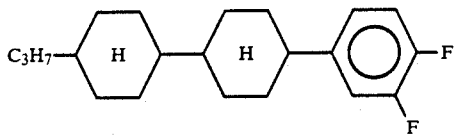

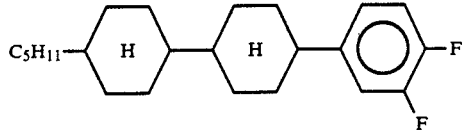

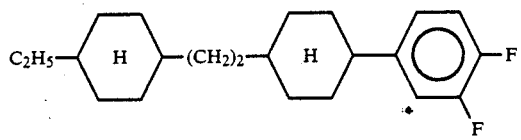

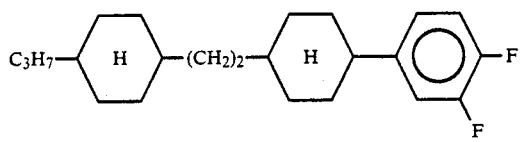

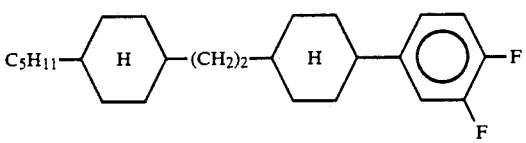

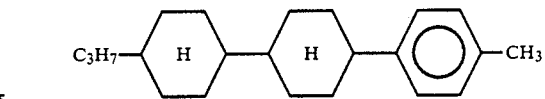

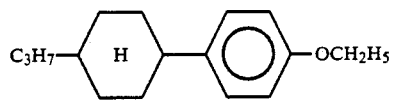

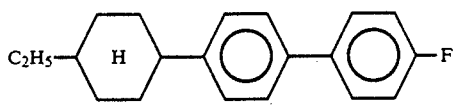

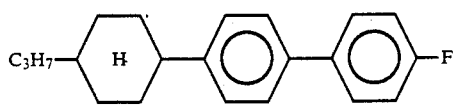

UNITED STATES PATENT AND TRADEMARK OFFICE
CERTIFICATE OF CORRECTION

PATENT NO. : 5,035,928
DATED : July 30, 1991
INVENTOR(S) : Kozaki et al It is certified that error appears in the above-identified patent and that said Letters Patent is hereby corrected as shown below:

On the title page  Item [73],Assignee change "Sharp Kabushiki Kaisha & Chisso Corp., 61991 10 099 07301991 JPX Japan 09061989 1-232372 6 1 1 Thomas; Alexander S. 6 9 11; Chisso Corp., both of Osaka, Japan" to --Sharp Kabushiki Kaisha 22-22, Nagaike-cho, Abeno-ku, Osaka-shi, Osaka, Japan and Chisso Corporation 3-6-32, Nakanoshima, Kita-ku, Osaka-shi, Osaka, Japan--

Signed and Sealed this

Thirtieth Day of March, 1993

*Attest:*

STEPHEN G. KUNIN

*Attesting Officer*          *Acting Commissioner of Patents and Trademarks*